(12) United States Patent
Smirnov

(10) Patent No.: US 9,898,013 B2
(45) Date of Patent: *Feb. 20, 2018

(54) MASS FLOW CONTROLLER FOR IMPROVED PERFORMANCE ACROSS FLUID TYPES

(71) Applicant: Hitachi Metals, Ltd., Minato-ku, Tokyo (JP)

(72) Inventor: Alexei V. Smirnov, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 225 days.

This patent is subject to a terminal disclaimer.

(21) Appl. No.: 14/837,344

(22) Filed: Aug. 27, 2015

(65) Prior Publication Data
US 2015/0362924 A1    Dec. 17, 2015

Related U.S. Application Data

(63) Continuation of application No. 13/782,714, filed on Mar. 1, 2013, now Pat. No. 9,146,563.

(51) Int. Cl.
*G05D 7/06* (2006.01)
(52) U.S. Cl.
CPC .......... *G05D 7/0635* (2013.01); *G05D 7/0629* (2013.01); *Y10T 137/0368* (2015.04); *Y10T 137/776* (2015.04); *Y10T 137/7759* (2015.04)
(58) Field of Classification Search
CPC ...... G05D 7/06; G05D 7/0617; G05D 7/0623; G05D 7/0629; G05D 7/0635
See application file for complete search history.

(56) References Cited

U.S. PATENT DOCUMENTS

| 5,062,446 A | 11/1991 | Anderson |
| 7,216,019 B2 | 5/2007 | Tinsley |

(Continued)

FOREIGN PATENT DOCUMENTS

| CN | 1514960 A | 7/2004 |
| CN | 1688948 A | 10/2005 |

(Continued)

OTHER PUBLICATIONS

Goto, Kenji, "International Search Report and Written Opinion re Appl. No. PCT/IB2014/000460", Aug. 7, 2014, p. 7, Published in: JP.

(Continued)

*Primary Examiner* — Eric Keasel
(74) *Attorney, Agent, or Firm* — Neugeboren O'Dowd, PC

(57) ABSTRACT

Mass flow controllers and methods for improving the control of a flow of a variety of fluid types are described. The method includes selecting a process gas type for the process gas that will be controlled and obtaining molecular mass information for the selected processed gas type. General characterization data is obtained that includes, for each of a plurality of flow and pressure value pairs, a corresponding control signal value and operating characterization data is generated by modifying the flow values in the general characterization data based upon the molecular mass for the selected process gas type. The operating characterization data is then used to operate a valve of the mass flow controller in open loop control mode.

15 Claims, 16 Drawing Sheets

(56) References Cited

U.S. PATENT DOCUMENTS

| | | |
|---|---|---|
| 7,467,027 B2 | 12/2008 | Ding et al. |
| 7,640,078 B2 | 12/2009 | Smirnov |
| 7,918,238 B2 | 4/2011 | Tanaka et al. |
| 9,027,585 B2 | 5/2015 | Smirnov |
| 9,146,563 B2 * | 9/2015 | Smirnov .............. G05D 7/0629 |
| 2004/0074311 A1 | 4/2004 | Lull et al. |
| 2007/0174016 A1 | 7/2007 | Ding et al. |
| 2008/0140260 A1 | 6/2008 | Ding |
| 2010/0000608 A1 | 1/2010 | Goto et al. |
| 2013/0146148 A1 | 6/2013 | Smirnov |

FOREIGN PATENT DOCUMENTS

| | | |
|---|---|---|
| CN | 1839358 A | 9/2006 |
| CN | 101501597 A | 8/2009 |
| CN | 101636641 A | 1/2010 |
| JP | 03204705 | 9/1991 |
| JP | 10111152 | 4/1998 |
| JP | 2004533049 A | 10/2004 |
| JP | 2009543229 A | 3/2009 |
| JP | 2010512571 A | 4/2010 |
| JP | 2013088926 A | 5/2013 |
| TW | 538327 B | 6/2003 |
| TW | 201111933 A | 4/2011 |
| TW | 201111934 A | 4/2011 |
| WO | 2008030454 A2 | 3/2008 |

OTHER PUBLICATIONS

SIPO, "Chinese Office Action Re Application No. 201480001017.7", dated Jan. 3, 2017, p. 10, Published in: CN.

Taiwan Patent Office, "Examination Report From Corresponding Taiwanese Application", dated Oct. 2017, p. 6 Published in: TW.

* cited by examiner

MASS FLOW CONTROLLER FOR IMPROVED PERFORMANCE ACROSS FLUID TYPES

CLAIM OF PRIORITY UNDER 35 U.S.C. § 120

The present application for patent is a Continuation of patent application Ser. No. 13/782,714 entitled "MASS FLOW CONTROLLER AND METHOD FOR IMPROVED PERFORMANCE ACROSS FLUID TYPES" filed Mar. 1, 2013, pending, and assigned to the assignee hereof and hereby expressly incorporated by reference herein.

FIELD OF THE INVENTION

The present invention relates to control systems, and in particular, but not by way of limitation, the present invention relates to systems and methods for controlling a flow of a fluid.

BACKGROUND OF THE INVENTION

A typical mass flow controller (MFC) is a closed-loop device that sets, measures, and controls the flow of a gas in industrial processes such as thermal and dry etching among other processes. An important part of an MFC is a sensor that measures the mass flow rate of the gas flowing through the device. Typically, a closed-loop control system of the MFC compares an output signal from the sensor with a predetermined set point and adjusts a control valve to maintain the mass flow rate of the gas at the predetermined set point.

A closed-loop control algorithm, if properly tuned, can be used to adjust a flow of a fluid in response to changes in fluid flow conditions that cause deviations away from a specified fluid flow set point. Changes in fluid flow conditions are often caused by variations in, for example, pressure, temperature, etc. Deviations away from the specified fluid flow set point caused by these variations are detected and corrected for based on measurements (e.g., feedback signal) generated by a sensing device (e.g., flow sensor measurements from a flow sensor) within a feedback loop of the closed-loop control algorithm.

When fluid flow conditions, however, change rapidly as a result of, for example, rapid pressure changes, sensing devices used by the feedback loop may saturate or produce unreliable feedback signals. If a flow controller, for example, uses these saturated and/or unreliable feedback signals within the closed-loop control algorithm, the flow controller may not deliver the fluid according to the specified fluid flow set point. The flow controller may, for example, over-compensate or under-compensate for changes in fluid flow conditions based on the unreliable feedback signals.

Another mode of operation where closed-loop systems do not perform well is when the valve is relatively far from a required position. For example, when an MFC is at a zero set point (zero valve position), and then is given a non-zero set point, it takes a relatively long time for the valve to move from the zero position to a position where noticeable flow appears and the closed-loop algorithm starts working properly. This results in a long response delay and poor performance of the MFC.

Open-loop systems have been utilized within MFCs to improve control over process gases when closed-loop systems do not perform well. In these systems, valve characterization data obtained in connection with a calibration gas (e.g., nitrogen) has been utilized to control the position of a valve of the MFC in an open-loop mode of operation. But the valve characteristics for different process gases may be very different than the calibration gas; thus if these typical MFCs are running a process that is different than the calibration gas the performance of the MFC may degrade significantly.

Accordingly, a need exists for a method and/or apparatus to provide new and innovative features that address the shortfalls of present closed-loop and open-loop methodologies.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Aspects of the present invention can provide a method for controlling mass flow of a process gas with a mass flow controller that includes selecting a process gas type for the process gas that will be controlled, obtaining molecular mass information for the selected processed gas type, receiving a set point signal corresponding to a desired mass flow rate, and receiving a pressure measurement of the process gas generated by a pressure sensor. In addition, the method includes disengaging, responsive to a threshold condition, a feedback control loop that controls a valve of the mass flow controller based upon a difference between a measured flow rate and the desired mass flow rate and determining a process control signal value for the desired flow value and pressure using a modified-flow-value that is based upon the desired process gas flow value, the molecular masses of the selected process gas type, and the calibration gas. The process control signal is then applied to the valve at the process control signal value to provide the process gas at the desired flow rate.

Another aspect may be characterized as a mass flow controller that includes a valve that is adjustable to control a flow rate of a fluid responsive to a control signal and a pressure transducer that provides a pressure signal that indicates a pressure of the fluid. In addition, a memory stores general characterization data that characterizes the mass flow controller in connection with a calibration gas and a mass flow sensor provides a measured flow rate of the fluid. A multi-gas control component generates an open-loop process control signal value for the desired flow value and pressure using a modified-flow-value that is based upon the desired process gas flow value and the molecular mass for the selected process gas type. A multi-mode control component disengages a feedback control loop when a threshold condition is satisfied and controls the valve using the open-loop process control signal.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein

DETAILED DESCRIPTION

Figure 1:
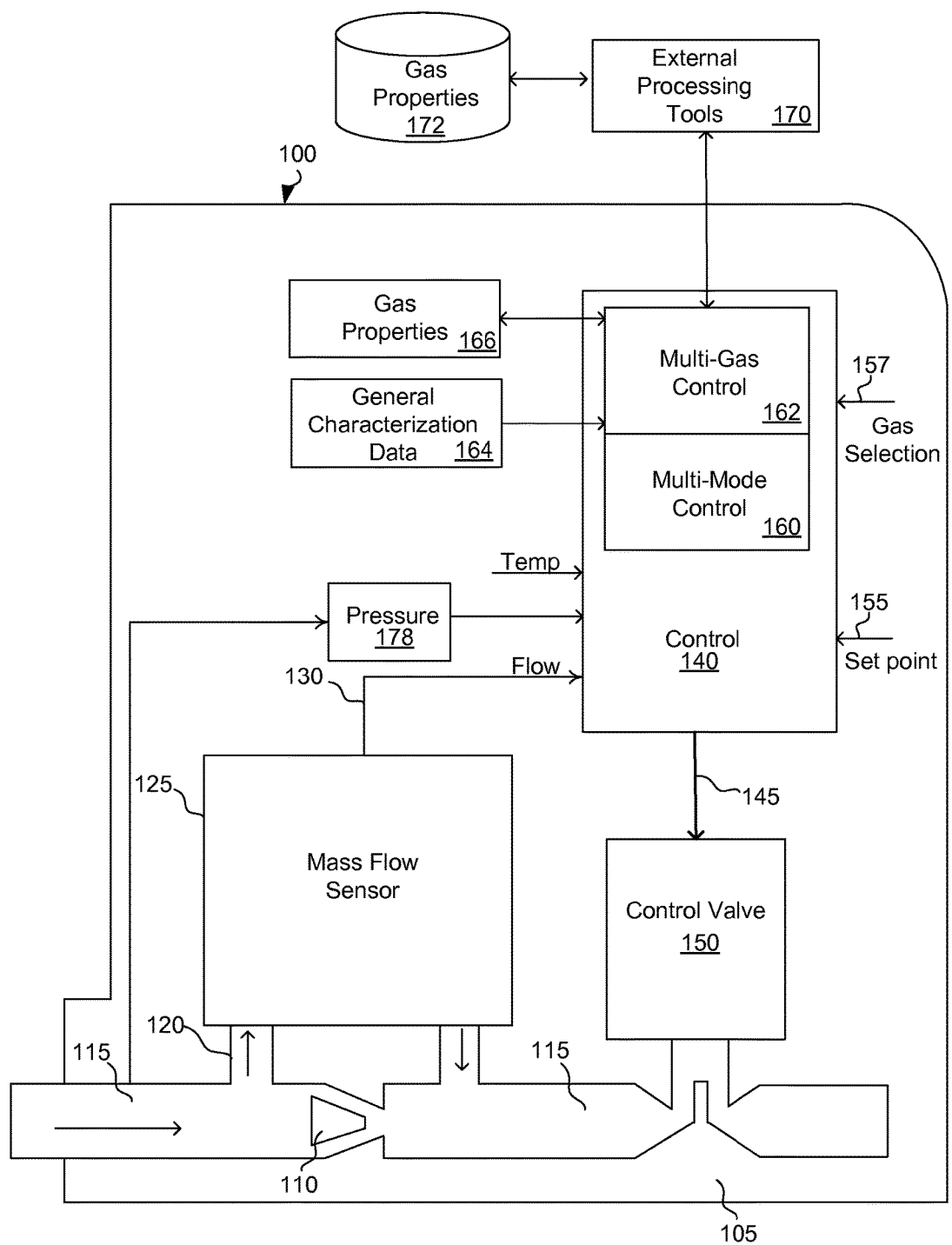
FIG. 1 is a block diagram that illustrates an exemplary mass flow controller that utilizes a multi-mode control approach and applies a process control signal based upon the type of process gas that is controlled.

Referring now to the drawings, where like or similar elements are designated with identical reference numerals throughout the several views where appropriate, and referring in particular to FIG. 1, it is a functional block diagram of an MFC 100 in accordance with an illustrative embodiment of the invention. As discussed in more detail further herein, aspects of the present invention include improved characterization of the mass flow controller 100 for a variety of fluid types (e.g., gas types) and applications of the improved characterization to improve performance of the MFC 100.

As depicted, in the present embodiment a base 105 of MFC 100 includes a bypass 110 through which a gas flows. The bypass 110 directs a constant proportion of gas through a main path 115 and sensor tube 120. As a consequence, the flow rate of the fluid through the sensor tube 120 is indicative of the flow rate of the fluid flowing through the main path 115 of the MFC 100.

In several embodiments, the fluid controlled by the MFC 100 is a gas (e.g., nitrogen), but a person skilled in the art will appreciate, having the benefit of this disclosure, that the fluid being delivered by the MFC 100 may be any kind of fluid including, for example, a mixture of elements and/or compounds in any phase, such as a gas or a liquid. Depending upon the application, the MFC 100 may deliver a fluid in a gaseous state (e.g., nitrogen) and/or a liquid state (e.g., hydrochloric acid) to, for example, a tool in a semiconductor facility. The MFC 100 in many embodiments is configured to deliver a fluid under high pressure, low temperature, or to different types of containers or vessels.

The sensor tube 120 may be a small bore tube that is part of a thermal mass flow sensor 125 of the MFC 100. In general, the mass flow sensor 125 provides an output signal 130 that is indicative of a mass flow rate of a fluid through the main path 115 of the MFC 100. As one of ordinary skill in the art will appreciate, the mass flow sensor 125 may include sensing elements that are coupled to (e.g., wound around) the outside of sensor tube 120. In one illustrative embodiment, the sensing elements are resistance-thermometer elements (e.g., coils of conductive wire), but other types of sensors (e.g., resistance temperature detectors (RTD and thermocouples) may also be utilized. Moreover, other embodiments may certainly utilize different numbers of sensors and different architectures for processing the signals from the sensors without departing from the scope of the present invention.

One of ordinary skill in the art will also appreciate that the mass flow sensor 125 may also include a sensing-element circuit (e.g., a bridge circuit) that provides an output, which is indicative of the flow rate through the sensor tube 120, and hence, indicative of the flow rate through the main path 115 of the MFC 100. And the output may be processed so the resultant output signal 130 is a digital representation of the mass flow rate of a fluid through the main flow path 115 of the MFC 100. For example, the mass flow sensor may include amplification and analog to digital conversion components to generate the output signal 130.

In alternative embodiments, the thermal mass flow sensor 125 may be realized by a laminar flow sensor, coriolis flow sensor, ultrasonic flow sensor or differential pressure sensor. Pressure measurements may be provided by a gage pressure sensor, differential sensor, absolute pressure sensor or piezoresistive pressure sensor. In variations, the mass flow sensor 125 and/or pressure measurements are used in combination with any combination of other sensors (e.g., temperature sensors) to accurately measure the flow of the fluid. These combinations are used, for example, in the feedback loop in the closed-loop mode or in the open-loop mode to control fluid flow and/or determine whether to change the multi-mode control algorithm from one mode to another.

The control component 140 in this embodiment is generally configured to generate a control signal 145 to control a position of the control valve 150 based upon a set point signal 155. The control valve 140 may be realized by a piezo valve or solenoid valve, and the control signal 145 may be a voltage (in the case of a piezo valve) or current (in the case of a solenoid valve). And as one of ordinary skill in the art will appreciate, the MFC 100 may include pressure and temperature sensors that provide pressure and temperature inputs to the control component 140. For example, the pressure sensor may be placed to sense pressure in the main path upstream of the sensor tube 120 or downstream of the bypass 110.

In this embodiment, the control component 140 operates in both a closed-loop mode and in open-loop mode to provide improved control over a variety of operating conditions (e.g., across pressure swings) in connection with a variety of operating gases. More specifically, the control component 140 in this embodiment includes a multi-mode control component 160 and a multi-gas control component 162. As one of ordinary skill in the art, in view of this disclosure will appreciate, these and other components of the control component 140 may be realized by a variety of components including software (e.g., stored in tangible, non-volatile memory), hardware and/or firmware or combinations thereof, and the components may store and execute non-transitory processor readable instructions that effectuate the methods described further herein.

In general, the multi-mode control component 160 operates to alternate the operation of the mass flow controller 100 between a closed-loop mode and an open-loop mode depending upon conditions that affect the output 130 of the mass flow sensor 125. In some instances, operating conditions affect the mass flow controller 100 to such an extent that the output 130 of the mass flow sensor 125 cannot be reasonably be relied on, and as a consequence, the multi-mode control component 160 operates in an open-loop mode.

More specifically, the multi-mode control component 160 is disposed to receive indications of the fluid pressure from a pressure sensor 178, and the multi-mode control component 160 is configured to change from the closed-loop mode to the open-loop mode when a sudden pressure change occurs that causes the thermal flow sensor 125 to generate an output 130 that is unreliable.

The multi-mode control component 160 changes from the closed-loop mode to the open-loop mode, for example, by disengaging the closed-loop control algorithm and engaging the open-loop control algorithm. When the disturbance(s) has subsided or after a defined period of time, the multi-mode control component 160 is configured to change from the open-loop mode back to the closed-loop mode. In many implementations the pressure change threshold condition that triggers the open-loop control mode is defined so that the multi-mode control component 160 changes from the closed-loop to the open-loop mode at or near the upper boundary of the operating range of the flow sensor 125. In some embodiments, the flow controller 100 receives and uses an indicator from another device or sensor such as a temperature sensor (not shown) for determining multi-mode changes and/or to control the flow of the fluid.

In some embodiments, when changing from the open-loop mode to the closed-loop mode, the mass flow controller 100 uses the fluid flow set point 155 and flow sensor measurements 130 in specified proportions as the feedback signal for the closed-loop control to create a smooth transition from the open-loop mode back to the closed-loop mode. This transition technique (also referred to as a "bumpless" transition) is appropriate when the fluid flow rate is not at, or substantially at, the fluid flow set point after operating for a period of time in the open-loop mode. In some implementations, bumpless transitions techniques are used to change the open-loop mode to the closed-loop mode and vice versa.

U.S. Pat. No. 7,640,078 entitled Multi-mode Control Algorithm, which is incorporated herein in its entirety by reference, discloses additional details relative to multi-mode control of an MFC, which embodiments of the present disclosure enhance.

As discussed further herein, while operating in the open-loop mode of control, characterization data is utilized in connection with fluid pressure information to control a position of the control valve 150. In the depicted embodiment, the multi-gas control component 162 utilizes general characterization data 164 in connection with gas-property data 166 in the open loop mode to control the position of the control valve 150.

The general characterization data 164, which may reside in nonvolatile memory, is utilized by the multi-mode control component 160 to control a position of the control valve 140 during the open-loop mode to convert one or more pressure readings into a valve position that provides a fluid flow rate that is sufficiently close, or equal, to the fluid flow level corresponding to the set point 155. In the embodiment depicted in FIG. 1, the characterization process to generate the general characterization data 164 is performed as part of a manufacturing process (e.g., carried out by a manufacturer or supplier of the MFC 100) before the mass flow controller 100 is utilized in a processing environment.

Figure 2:
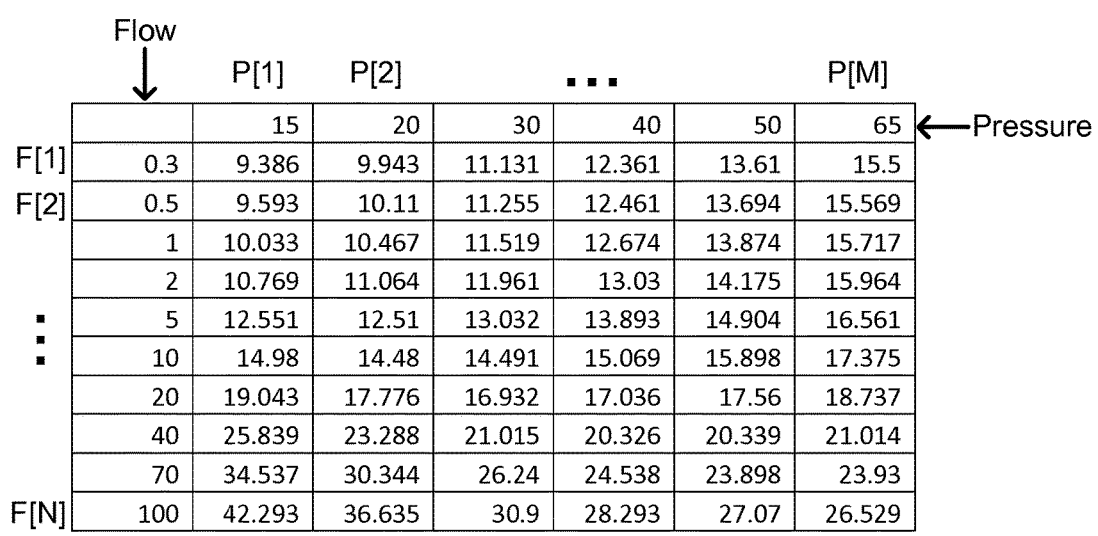
FIG. 2 is a table that depicts exemplary general characterization data.

More specifically, the general characterization data 164 is generated using a calibration gas (e.g., nitrogen), which is supplied to the mass flow controller 100 at M different pressures P[1], P[2], ... P(M). For each pressure, N flow set points are given to the device (F[1], F[2], ... F[N]), and the valve control signal providing stable flow is recorded. As depicted in FIG. 2, the resulting general characterization data 164 can be represented in a matrix V of size N*M, with valve control signal components V[i,j], where i=1 ... N, and j=1 ... M. Vectors P, F, and matrix V are stored in a memory of the mass flow controller 100 and are used by the control component 140 during the open loop mode of MFC operation.

When valve characterization is performed with one calibration gas, the general characterization data 164 provides acceptable performance of the mass flow controller 100 only for this specific calibration gas. However, as one of ordinary skill in the art will appreciate in view of this disclosure, when the process gas (i.e., the gas that is controlled during actual operation) is different than the calibration gas, the valve control signal in the general characterization data 164 corresponding to a desired flow set point (at the operating pressure) will not result in a valve position that provides the desired flow.

A solution that would provide very accurate multi-process-gas characterization of the mass flow controller 100 would be to use actual process gases during the characterization process. But this type of multi-process-gas characterization is not viable for many reasons: many gases used in the industry are toxic and/or flammable, so these gases cannot be safely used by manufacturers; characterization for high-flow devices requires a significant amount of a gas, and many gases are very expensive; and characterizing an MFC in connection with many gases is very time-consuming process, and as a result, it is not economically viable.

As a consequence, the multi-gas control component 162 utilizes gas property data 166 in connection with the general characterization data 164 to generate a valve control signal 145 that positions the control valve 150 so that the flow of any of a variety of process gases through the MFC 100 is the desired flow rate as indicated by the set point 155.

More specifically, Applicant has found that a ratio of process gas flow $F_{pr}$ to calibration gas flow $F_{cal}$ at the same pressure and valve position can be approximately expressed as:

$$F_{pr}/F_{cal} = (M_{cal}/M_{pr})^k \qquad \text{Equation 1}$$

where $M_{cal}$ is a molecular mass of a calibration gas, $M_{pr}$ is a molecular mass of a process gas, and k has a value between 0.2 ... 0.5, depending on the MFC flow range (bin).

As a consequence, to apply this discovered relationship, the gas property data 166 in several embodiments includes molecular mass data for a plurality of gases. As shown, this data may be updated by communication link with external processing tools 170 that is coupled to an external gas property datastore 172. It is also contemplated that for a plurality of process gases, a plurality of molecular mass ratio values (equal to ($M_{cal}/M_{pr}$)) may be stored in the gas property data. Regardless of the stored representation, several embodiments described further herein utilize the relationship represented by Equation 1 to more accurately control the flow of process gases using general characterization data 164 that was obtained with a calibration gas.

Figure 3:
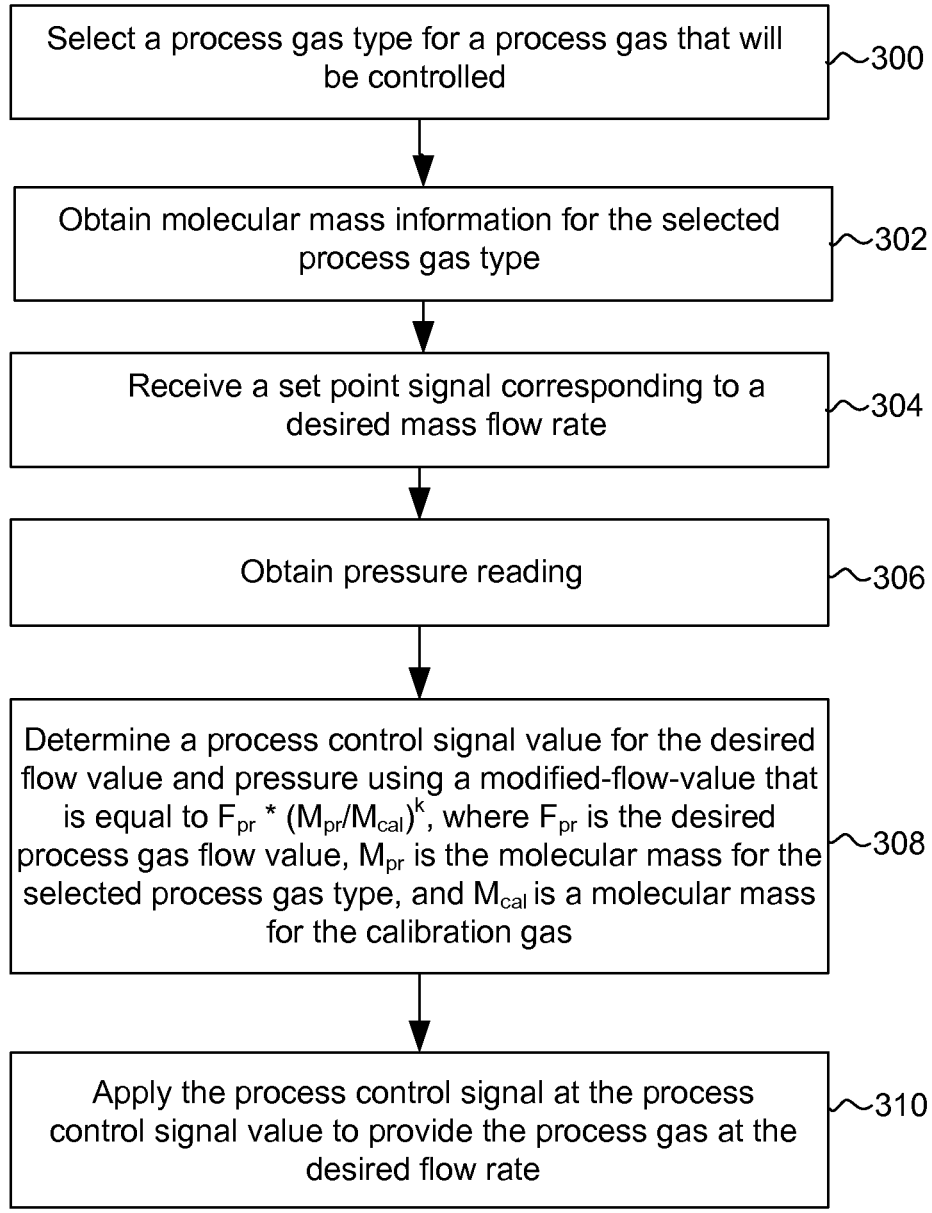
FIG. 3 is a flowchart depicting an exemplary method that may be traversed in connection with the embodiment depicted in FIG. 1.

While referring to FIG. 1, simultaneous reference is made to FIG. 3, which is a flowchart depicting an exemplary method that may be traversed in connection with the embodiment depicted in FIG. 1. As shown, during operation a process gas selection (shown by gas selection input 157 in FIG. 1) is made for a process gas that will be controlled (Block 300). Although not depicted in FIG. 1 for clarity, one of ordinary skill will appreciate that the mass flow controller may include user interface components (e.g., a display and buttons, touch pad, or a touchscreen) to enable an operator to select the process gas that will be controlled. Alternatively, the mass flow controller may be coupled to a control network via well-known wireline or wireless network technologies to enable a process gas to be selected from another control location (e.g., using the external processing tools 170).

In addition, molecular mass information is obtained from the gas properties data 166 (or the remote gas properties data 172) for the selected process gas type (Block 302), and a set point signal 155 is received that corresponds to a desired mass flow rate (Block 304). For example, the molecular mass information may include a molecular mass of the process gas $M_{pr}$ (or another value indicative of $M_{pr}$ or derived from $M_{pr}$) or as another example, the molecular mass information may include a molecular mass ratio value (equal to ($M_{cal}/M_{pr}$)) or another value indicative of, or derived from, the molecular mass ratio value. With respect to the desired mass flow rate (indicated by the set point signal 155), it may be a flow rate that is needed for a particular process in connection with a plasma-based (e.g., thin-film deposition) processing system.

As discussed above, a rapid rate of pressure change may render the flow signal 130 unreliable, and as a consequence, the multi-mode control component 160 disengages a feedback control loop that controls the valve 150, and a pressure reading is obtained (Block 306), which is utilized to obtain a valve position value to control the control valve 150. If the process gas being controlled happens to be the same type of gas that was used to generate the general characterization data 164, then the general characterization data 164 may simply be accessed, using the measured pressure value to obtain a valve position value for the valve control signal 145. But frequently the process gas that is used during actual use of the mass flow controller 100 is different than the gas that is used to generate the general characterization data 164. As a consequence, by virtue of the process gas having different flow properties than the characterization gas, the valve position value obtained from the general characterization data 164 would result in a valve position that provides a flow rate that is substantially different than the desired mass flow rate.

As a consequence, the exemplary mass flow controller 100 depicted in FIG. 1 utilizes the molecular relationship represented in Equation 1 to generate a process control signal value that is specific to the process gas. More specifically, a process control signal value for the desired flow value and pressure is determined using a modified-flow-value that is equal to $F_{pr}*(M_{pr}/M_{cal})^k$, where $F_{pr}$ is the desired process gas flow value, $M_{pr}$ is the molecular mass for the selected process gas type, and $M_{cal}$ is a molecular mass for the calibration gas (Block 308).

A more clear understanding of how the determination at Block 308 is made is facilitated with reference again to the exemplary general characterization data depicted in FIG. 2. It should be recognized that the exemplary general characterization data that is shown in FIG. 2 will vary from mass flow controller to mass flow controller.

Assuming that the desired flow value is 20% of the rated flow capacity of the mass flow controller 100, and the pressure reading obtained at Block 306 is 30 units (e.g., pounds per square inch), the valve position value of the valve control signal 145 for general-characterization gas (e.g., nitrogen) is 16.932. But as discussed above, when the process gas is different than the general-characterization gas, the 16.932 valve position value will not provide the desired 20% flow rate.

Consistent with Equation 1, the modified-flow-value is calculated as $F_{pr}*(M_{pr}/M_{cal})^k$, and assuming the term $(M_{pr}/M_{cal})^k$ is equal to 2.0, then the modified-flow-value is (20%*2.0) or 40%, and as a consequence, at the pressure of 30, the process valve position value is 21.015. Thus, the process valve position value (also referred to herein as the process control signal value) that provides 20% flow for the hypothetical process gas in this example is 21.015. If either the desired flow value or the modified flow values are not found in the general characterization data 164, then interpolation may be used.

As shown in FIG. 3, the process control signal 145 is then applied to the control valve 150 at the process control signal value to provide the process gas at the desired flow rate (Block 310). In many embodiments, after changes in pressure have reduced or a timer expires, the multi-mode control component 160 reverts back to a closed-loop mode of operation.

Figure 4:
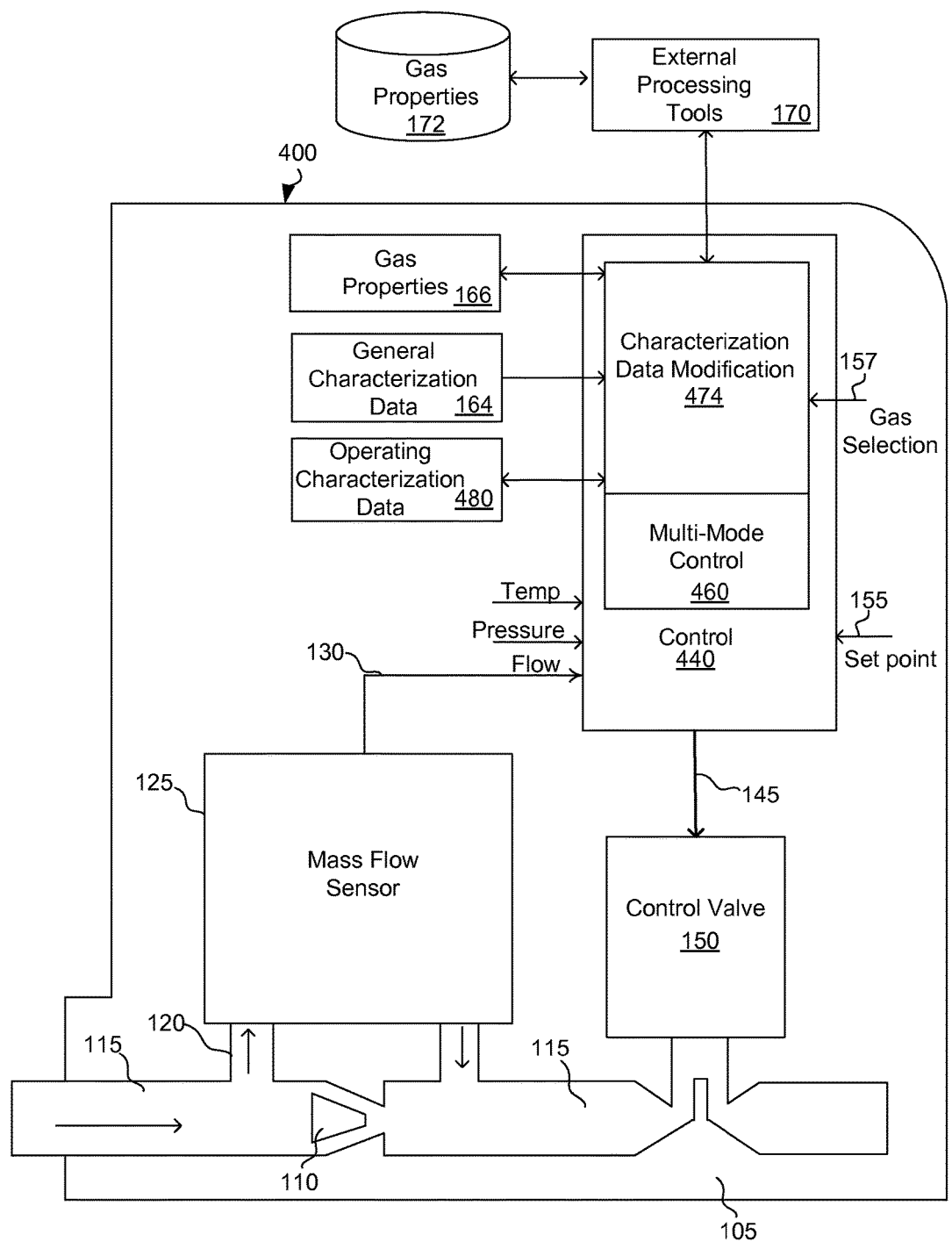
FIG. 4 is a block diagram depicting another embodiment of a mass flow controller.

Referring next to FIG. 4, it is a functional block diagram of an exemplary embodiment of another MFC 400. As shown, this embodiment includes many of the same components as the MFC 100 described with reference to FIG. 1, but unlike the MFC 100, in this embodiment, the MFC 400 modifies the general characterization data 164 into operating characterization data 480, which is utilized to control a position of the control valve 150 when the MFC 400 is operating in open-loop mode.

More specifically, a control component 440 of the MFC 400 includes a characterization data modification component 474 that functions to modify the general characterization data 164 to the operating characterization data 480 based upon the gas selection input 157. The control component 440, and its constituent components may be realized by a variety of different types of mechanisms including software (e.g., stored in non-volatile memory), hardware and/or firmware or combinations thereof, and the components may store and execute non-transitory processor readable instructions that effectuate methods described further herein.

Figure 5:
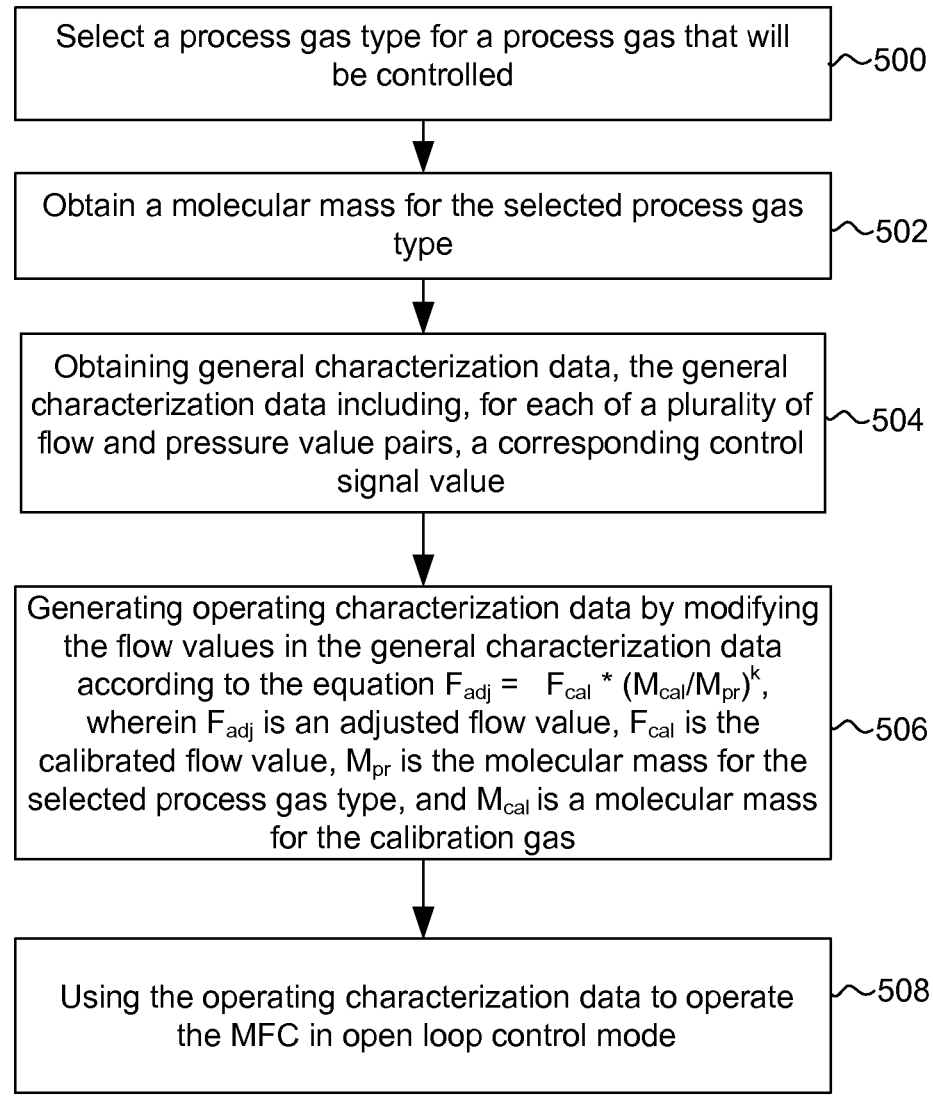
FIG. 5 is a flowchart depicting an exemplary method that may be traversed in connection with the embodiment shown in FIG. 4.

While referring to FIG. 4, for example, simultaneous reference is made to FIG. 5, which is a flowchart depicting an exemplary method that may be traversed in connection with the embodiment shown in FIG. 4. As shown, in this embodiment, when a process gas type is selected for a process gas that will be controlled (Block 500), a molecular mass for the selected process gas type is obtained from the gas properties data 166 (or remote gas properties data 172)(Block 502), and general characterization data 164 is also obtained by the characterization data modification component 474 (Block 504).

As shown, in this embodiment the characterization data modification component 474 generates operating characterization data by modifying the flow values in the general characterization data according to the equation:

$$F_{adj} = F_{cal} * (M_{cal}/M_{pr})^k \qquad \text{Equation 2}$$

wherein $F_{adj}$ is an adjusted flow value $F_{cal}$ is the calibrated flow value, $M_{pr}$ is the molecular mass for the selected process gas type, and $M_{cal}$ is a molecular mass for the calibration gas (Block 506).

The operating characterization data 480 is then used by the multi-mode control component 460 to operate the MFC 400 in the open-loop control mode (Block 508).

As discussed above, the operating characterization data 480 provides improved characterization of the mass flow controller 100 for a variety of gas types, which is very advantageous when the MFC is operating in an open-loop mode of operation as discussed above. But in addition, the operating characterization data 480 also provides improved operation with other control methodologies. For example, FIGS. 6-13 describe embodiments that benefit from the improved characterization that the operating characterization data 480 provides.

Figure 6:
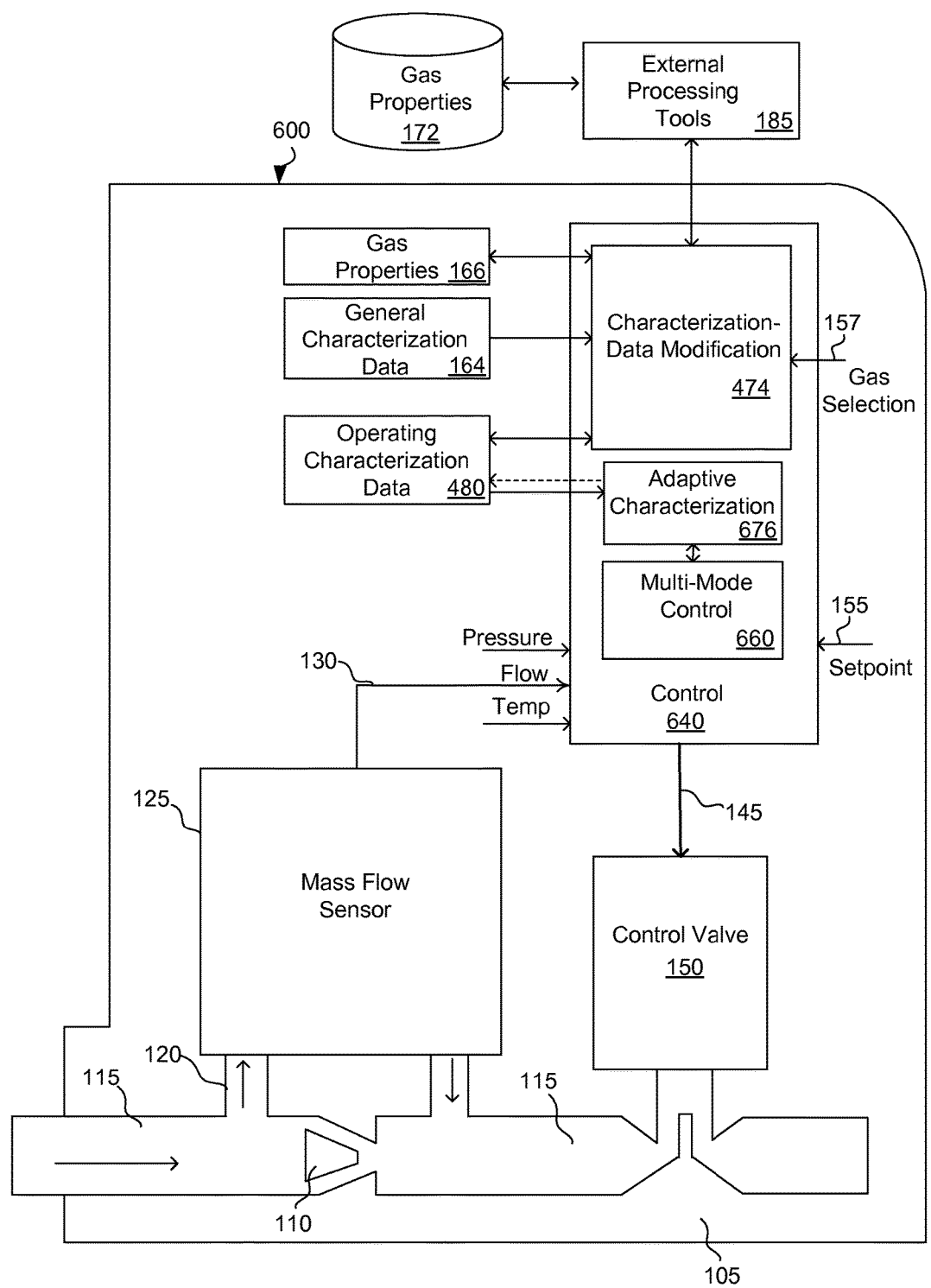
FIG. 6 is a block diagram depicting yet another embodiment of a mass flow controller.

For example, FIG. 6 is a functional block diagram of an exemplary embodiment of yet another MFC 600 that utilizes the improved characterization that the operating characterization data provides. As shown, this embodiment includes many of the same components as the MFC 100 described with reference to FIG. 1 and the MFC 400 described with reference 4, but unlike the MFCs 100, 400, in this embodiment an adaptive characterization component 676 is coupled to the operating characterization data 480.

The adaptive characterization component 174 generally operates in this embodiment to adjust the operating characterization data 480 during operation of the MFC 600 to accommodate, for example, any inaccuracies in the application of Equation 1 and/or variances of operating pressures during operation. Thus, the operating characterization data 480 provides initial characterization data for a variety of process gases, and the adaptive characterization component 676 further adjusts the operating characterization data 480 during operation of the MFC 600 during the open-loop mode of operation to reduce deficiencies (e.g., control errors) that may occur during operation (e.g., due to changes in pressure and any inaccuracies in the operating characterization data 480).

In many implementations, to determine an appropriate adjustment, once the mass flow controller 600 is operating in the open-loop mode (e.g., because a pressure deviation occurred), the adaptive characterization component 676 obtains a measured flow reading at the moment when the closed-loop mode is being started again. And depending upon a flow error and a direction of pressure change at the moment when the closed-loop mode is started again, the corresponding characterization value is increased or decreased.

Figure 7:
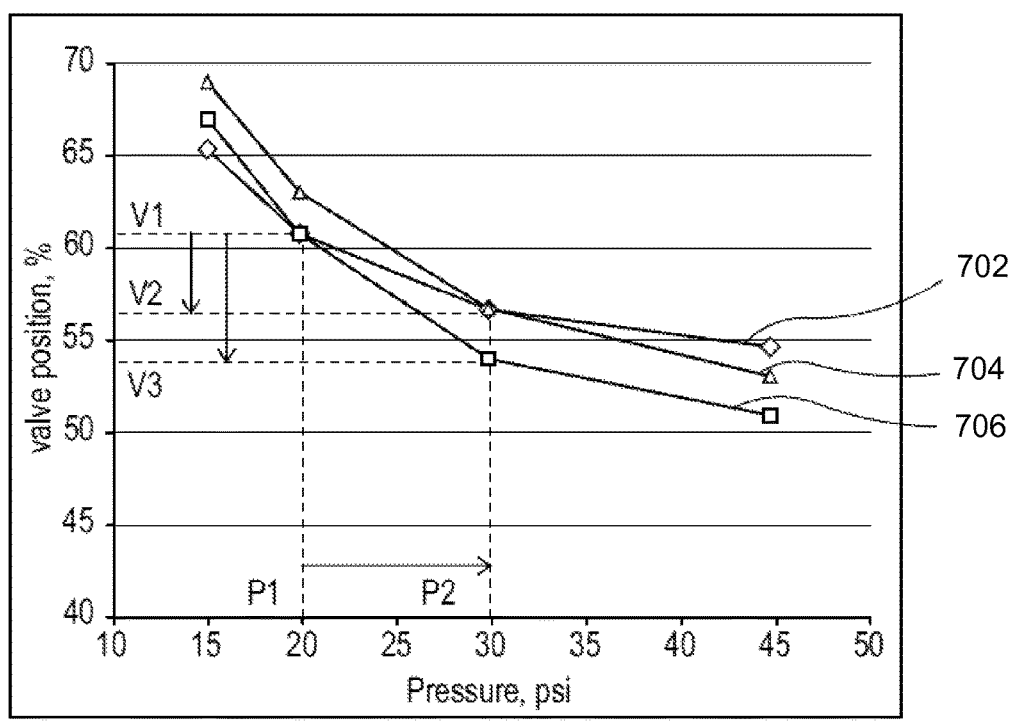
FIG. 7 is a graph depicting an exemplary series of events leading to an adjustment of the operating characterization data depicted in FIG. 6.

Referring to FIG. 7, it is a graph that includes the following three curves that are utilized to illustrate an exemplary series of events leading to an adjustment of the operating characterization data 480 to provide 100 percent flow when a process gas (instead of nitrogen) is controlled: an unadjusted valve position curve 702 for a process gas, a 110 percent flow curve 704 for the process gas, and a desired valve position curve 706 (to provide 100 percent flow) for the process gas. The unadjusted valve position curve 702 represents the position of the valve 150 versus pressure when operating characterization data 480 (that is unadjusted) is utilized to control the valve 150 during an open-loop mode of operation. The 110 percent flow curve 704 represents valve positions versus pressure that would provide a 110 percent flow rate for the process gas, and the desired valve position curve 706 represents valve positions versus pressure that would provide the desired 100 percent flow of the process gas.

As shown in this example, at point (V1, P1), the multi-mode control component 460 switches from a closed-loop mode of operation to an open-loop mode of operation (e.g., because the rate at which the pressure was decreasing just before (V1, P1) exceeded a threshold). And as shown, when the process gas is controlled using operating characterization data 480 that is unadjusted, the valve position of the valve 150 at pressure P2 is V2, which is the valve position that provides 110 percent flow when the process gas is controlled. In contrast, to provide 100 percent flow for the process gas at pressure P2, the valve position needs to be at position V3.

As a consequence, in this example when the operating characterization data 480 is unadjusted, the flow rate is too high (i.e., because the position of the valve is more open, at about 57 percent, when the valve position should be about 54 percent open). In this example, at pressure P2, the multi-mode control component 660 switches back to the closed-loop mode of operation and an adjustment to the operating characterization data 460 is calculated based on a relation to a difference between a measured flow rate (corresponding to the actual valve position V2) and a flow set point (corresponding to a desired valve position V3) so that the next time the multi-mode control component 660 switches to the open-loop mode of operation, the position of the valve 150 more closely tracks the desired valve position curve 706 than the unadjusted valve position curve 702.

The adaptive characterization component 676 may apply the adjustment to the operating characterization data 480 by optionally changing existing valve position values in the operating characterization data 480 (e.g., by the optional communication from the adaptive characterization component 676 to the operating characterization data 480); by adding additional data to the operating characterization data 480; or the operating characterization data 480 may remain the same (e.g., as it was generated as discussed wither reference to FIGS. 4 and 5) and the adaptive characterization component 676 applies a scaling factor to the operating characterization data 480.

In implementations where the operating characterization data 480 remains the same and a scaling factor is applied, the scaling coefficient K, may be calculated as follows: K=(V3−V1)/(V2−V1), but it is certainly contemplated that other scaling factors may be used. And this scalar K is used to adjust how the valve 150 is controlled by the operating characterization data 480 in the open-loop mode. In. FIG. 7, for example, K is approximately equal to (54%−61%)/(56%−61%) or 1.4. The scalar 1.4 is indicative of how much more the valve 150 needs to move so that after the open-loop mode of operation ends at pressure P2, the position of the valve 140 is closer to (P2, V3). In this example, without adjustment, the operating characterization data 480 dictates that the valve 150 moves from about 61% (at V1) to 56% (at V2), (about 5% difference) so the scalar 1.4 is multiplied by the 5% difference to obtain an adjusted difference of −7%.

As a consequence, when the open-loop mode is engaged again (under the same changes in pressure), the position of the valve 150 at P2 when the open-loop mode of operation ceases is (61% (at V1) minus 7%) or 54%. To arrive at adjusted valve positions between P1 and P2 (so the valve position more closely tracks the desired valve position curve 706), the value of the scaling factor K for each pressure value between P1 and P2 may be calculated by interpolation.

Alternatively, instead of calculating a new coefficient as discussed above, incremental adjustments can be made to the coefficient during each iteration in which the multi-mode control component 660 changes from the open-loop mode to the closed-loop mode. These incremental adjustments can be made until a difference between a measured flow and a flow set point (at the moment when the multi-mode control component 660 switches from the open-loop mode to the closed-loop mode) falls below a threshold.

In implementations where the operating characterization data 480 is augmented or changed, the operating characterization data 480 may store adjusted characterization data for each process gas. Or in other variations, adjusted characterization data for a plurality of process gases may be uploaded (e.g., by communication links well known to those of skill in the art) to the external processing tools 185 and stored externally from the MFC 600, and then the adjusted characterization data may be retrieved when needed.

Additional details of adaptive characterization of calibration data for a calibration gas are found in U.S. patent application Ser. No. 13/324,175 entitled Adaptive Pressure Insensitive Mass Flow Controller and Method for Multi-Gas Applications, which is incorporated herein by reference in its entirety.

Figure 8:
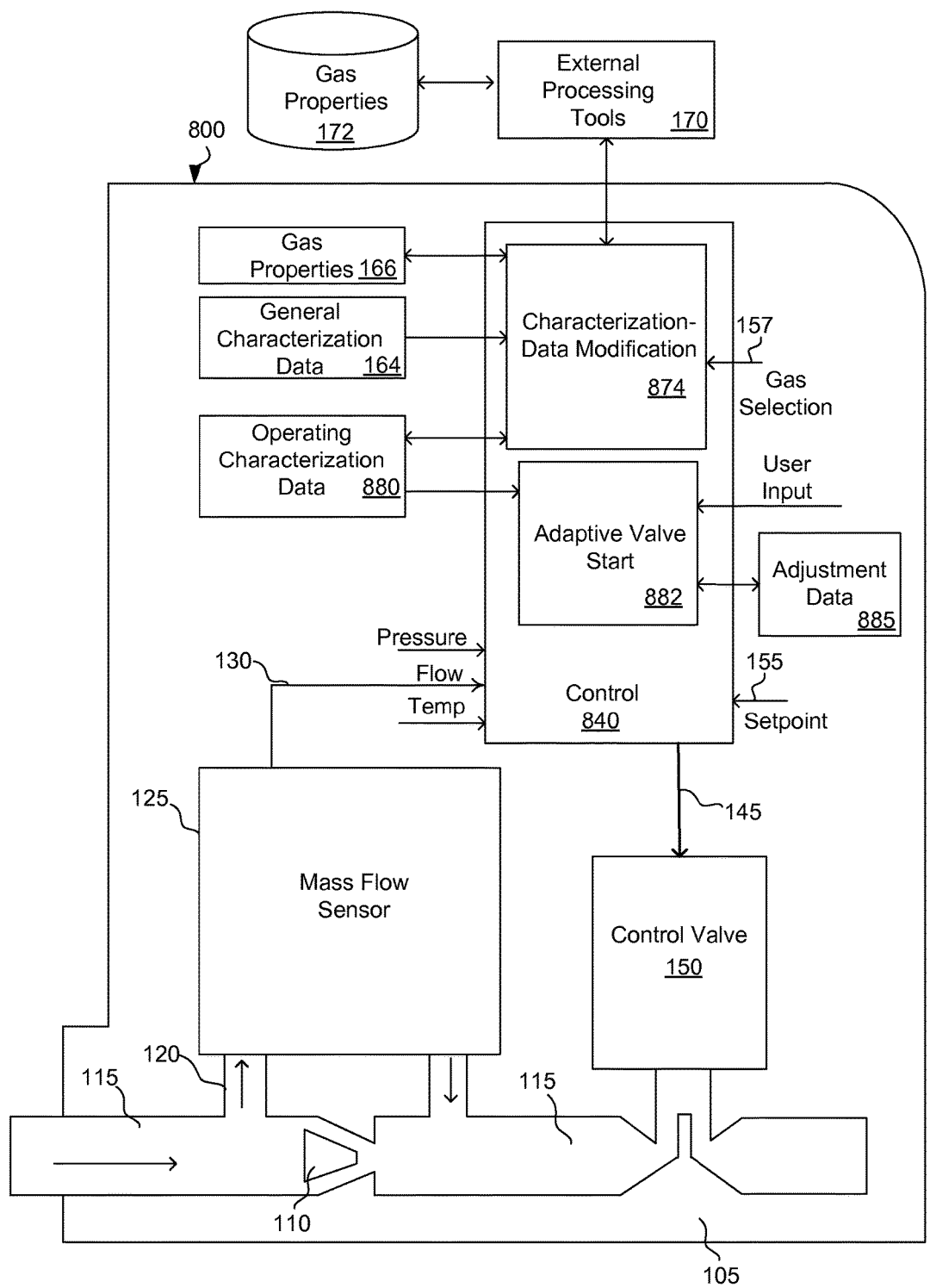
FIG. 8 is a block diagram depicting yet another embodiment of a mass flow controller.

Referring next to FIG. 8, shown is a block diagram of another exemplary MFC 800. As shown, this embodiment includes many of the same components as the MFC 100 described with reference to FIG. 1 and the MFC 400 described with reference 4, but unlike the MFCs 100, 400, in this embodiment an adaptive valve start component 882 is coupled to the operating characterization data 880.

In general, the adaptive valve start component 882 operates to provide an adjustable non-zero starting control signal 145 to the control valve 150, based upon the operating characterization data 880 and runtime data of the MFC 800, when the control valve 150 is closed, to more quickly respond to the set point signal 155. In addition, the user input to the adaptive valve start component 882 enables a user to alter the adjustable non-zero starting control signal 145 to adjust a response of the MFC 800. And the adaptive valve start component 882 generates the adjustment data 885, and uses the adjustment data 885 to adjust the adjustable non-zero starting control signal 145 to compensate for the effects of temperature drift, aging, and other factors that affect the response of the MFC 800. Thus, the adaptive valve start component 882 may be used to establish a desired transient response (e.g., based upon user input) by setting a value of the adjustable non-zero starting control signal 145, and then the adaptive valve start component 882 adjusts the adjustable non-zero starting control signal 145 to maintain the desired transient response when the environment and/or age affects the transient response.

In prior implementations, the closed-loop control loop of mass flow controllers performed relatively well when the valve 150 is relatively close to a required position and its movement changes the flow, so that the control loop sees flow response and immediately adjusts the valve position accordingly. But in these prior systems, when the MFC was set to a zero position (zero valve position), and the MFC was given a non-zero set point, it would take a long time for the valve to move from a zero position to a position where a noticeable flow would appear and the closed-loop control loop would start working properly. As a consequence, there was a long response delay and generally poor MFC performance.

Thus, to remove the response delays and poor performance, the adaptive valve start component 882 improves the performance of the MFC 800 by immediately moving the control signal 145 from a zero value (e.g., zero current or voltage) to an adjustable non-zero starting control signal value while the control valve 150 is closed.

Figure 9:
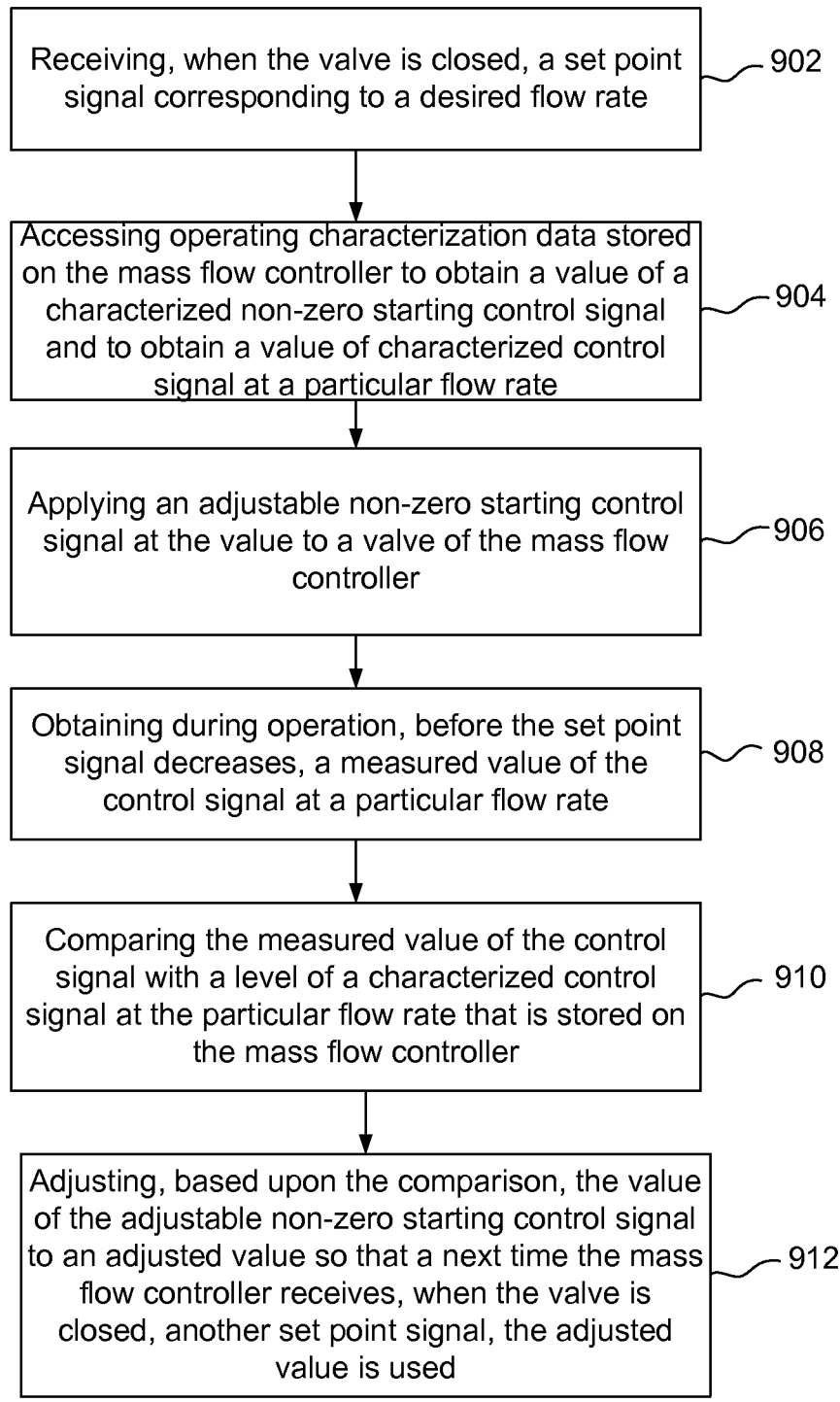
FIG. 9. shown is a flowchart that depicts a process that may be traversed by the mass flow controller depicted in FIG. 8 during runtime.

Referring next to FIG. 9, shown is a flowchart that depicts a process that may be traversed by the MFC 800 during runtime. Although reference is made to the MFC 800 described with reference to FIG. 8, it should be recognized that the process depicted in FIG. 9 is not limited to the specific, exemplary embodiment in FIG. 8. As depicted, in operation, when the control valve 150 is closed, the set point signal 155 is received that has a value corresponding to a desired flow rate (Block 902). In the context of plasma processing (e.g., thin film deposition), the flow rate may be the desired flow rate for a specific gas that is needed as part of the plasma process.

As shown, the operating characterization data 880 is accessed to obtain a value of a characterized non-zero starting control signal and a value of a characterized control signal at a particular flow rate, and these values are used later to adjust the adjustable non-zero starting control signal (Block 904). The control signal 145 is then applied as an adjustable non-zero starting control signal at an initial value to the control valve 150 (Block 906). As a consequence, the closed-loop control system of the MFC 800 is engaged substantially sooner (when the flow is about to start or has just started) as opposed to prior approaches where the starting control signal value is zero and the control loop is not engaged until after a delay during which the control signal slowly reaches a level (using the control loop) where the flow begins.

When the MFC 800 is first deployed for use (e.g., when a user receives the MFC 800 from a supplier), the characterized non-zero starting control signal may be used as the initial value of the adjustable non-zero starting control signal, but once the MFC 800 is in use, the adjustable non-zero starting control signal is based upon the operating characterization data 880 and run time data.

For example, in embodiments where the operating characterization data 880 includes data for a plurality of pressures, the control signal 145 is applied at Block 906 as an adjustable non-zero starting control signal at a value that is obtained by adding difference data (stored in the adjustment data 885) to the calibrated non-zero starting control signal. The difference data in these embodiments is based upon differences between the operating characterization data 880 and run time measurements that were previously obtained during one or more previous process runs. Additional information detailing an exemplary approach for generating the difference data is provided below with reference to Blocks 910 and 912 below.

And in the embodiments where the operating characterization data 880 includes characterization data for only a single pressure, the adjustment data 885 includes the value of the adjustable non-zero starting control signal, and the control signal 145 is applied at Block 906 as an adjustable non-zero starting control signal at the value obtained from the adjustment data 885. As discussed below with reference to Blocks 910 and 912, the stored value of the adjustable non-zero starting control signal may be adjusted during each run and updated in the adjustment data 885.

Regardless of whether the operating characterization data 880 is based upon a single pressure or multiple pressures, the value of the control signal (at a particular flow rate) that is obtained in Block 904 is utilized, as discussed further below, to adjust the adjustable non-zero starting control signal during a subsequent run. Although two pieces of data are obtained in Block 904, it should be recognized that these two pieces of data need not be obtained co-currently.

In the implementations where the operating characterization data 880 includes data for each of a plurality of pressure levels, a pressure transducer in the MFC 800 may be used to obtain a signal that is indicative of a pressure of the fluid, and the operating characterization data 880 may be accessed to select a value of a characterized non-zero starting control signal that is based upon the measured pressure.

But having characterization data for a plurality of pressures is not required in connection with the method depicted in FIG. 9, at least, because the method in FIG. 9 contemplates that valve/flow characteristics are not constant and may change and as a consequence, the adjustable non-zero starting control signal is adjusted to account for variances in operating conditions that affect valve/flow characteristics.

Although applying an adjustable non-zero starting control signal to the MFC 800 when the control valve 150 is closed will generally improve a response of the MFC 800, it is contemplated that users of the MFC 800 will desire a particular transient response depending upon the particular processing application in which the MFC 800 is used. As a consequence, in many embodiments the adaptive valve start component 882 enables a user to define (by way of the user input) a desired transient response of the MFC 800 by adding or subtracting an offset from the adjustable non-zero starting control signal.

Figure 10A:
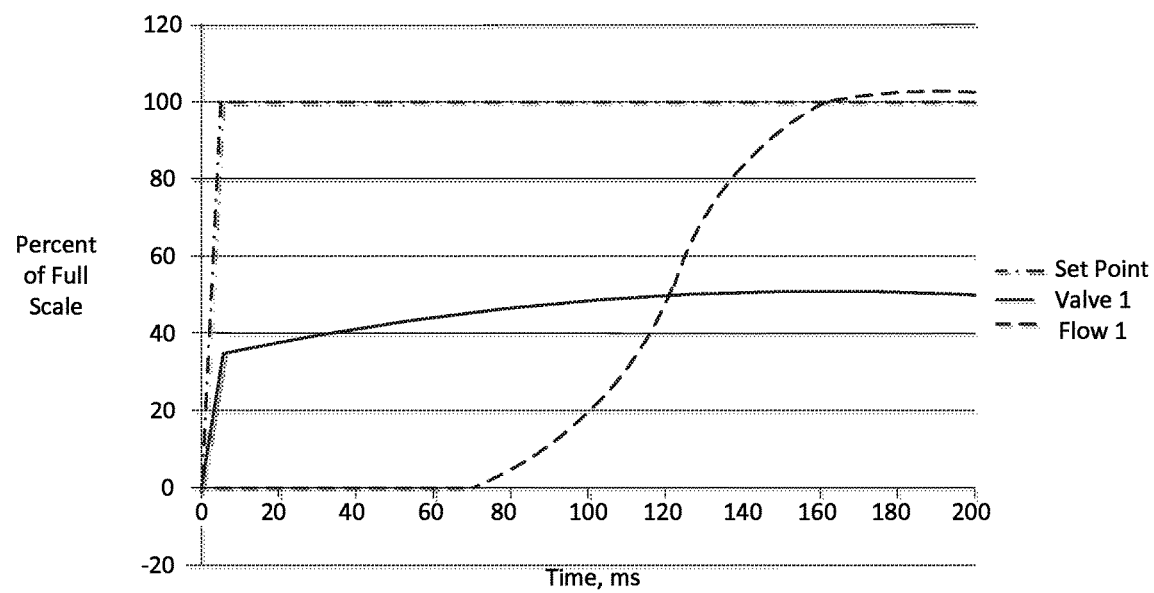
FIG. 10A is a graph depicting transient flow conditions relative to a starting control signal.
Figure 10B:
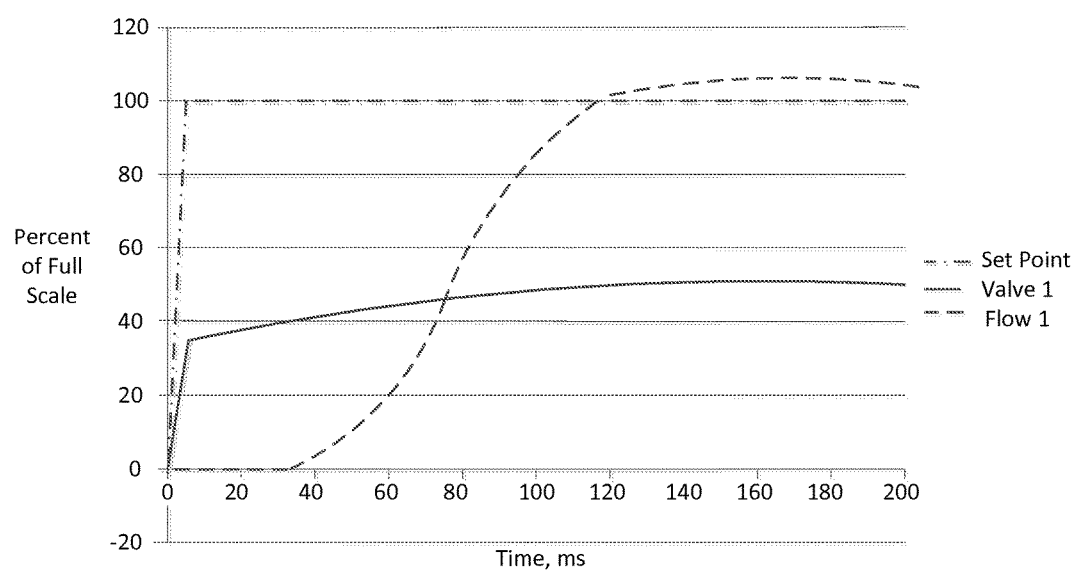
FIG. 10B is a graph depicting transient flow conditions relative to another starting control signal.
Figure 10C:
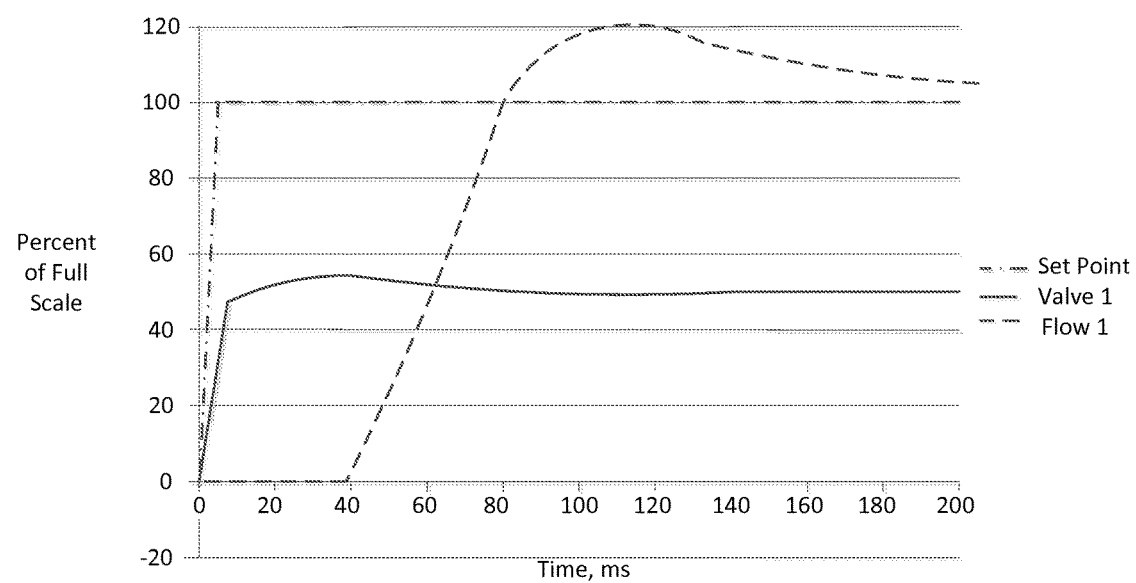
FIG. 10C is a graph depicting transient flow conditions relative to yet another starting control signal.

Referring to FIGS. 10A-10C, for example, shown are graphs that depict transient flow conditions relative to three corresponding starting control signals. In FIG. 10A for example, shown is a starting control signal that has a value that produces a response that is slower than the starting control signals in FIGS. 10B and 10C. In some applications, the slower response in FIG. 10A may be desirable, but in other applications the response may be less than optimal as compared to the starting control signal depicted in FIGS. 10B and 10C, which produce faster response times. As a consequence, if the initial non-zero starting control signal obtained from the operating characterization data 880 produces the response depicted in FIG. 10A, a positive offset may be added to the non-zero starting control signal to produce the transient response in FIG. 10B or a larger offset may be added to the non-zero starting control signal to produce the transient response in FIG. 10C.

Similarly, if the non-zero starting control signal provides the response shown in FIG. 10C, which results in a transient overshoot that may not be acceptable during runtime processing, the user may add a negative offset to non-zero starting control signal to produce the response in FIG. 10B, or the user may add a larger negative offset to the non-zero starting control signal to produce the slower response in FIG. 10A.

Although the adjustable non-zero starting control signal generally improves response, and may be configured to arrive at a desired transient response, environmental (e.g., temperature) and other factors (e.g., age of the MFC 800) affect the relationship between the transient response and the starting control signal. In other words, if a desired transient response is achieved (e.g., by adjustment with an offset that is applied to the starting control signal), temperature and age will cause the MFC 800 to have a different response with the same starting control signal.

Figure 11:
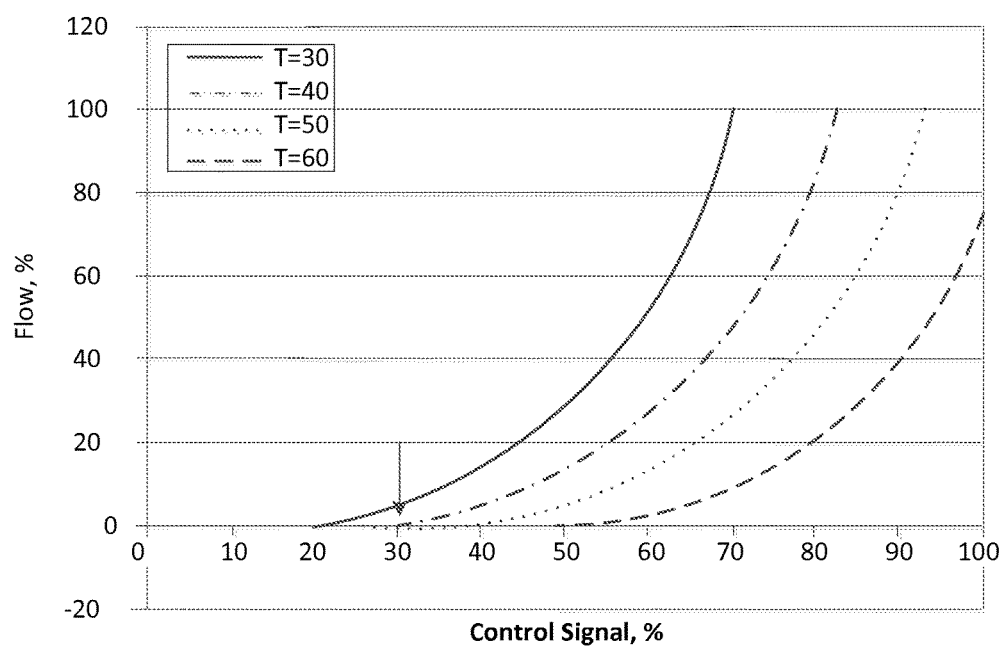
FIG. 11 is a graph depicting flow-versus-control-signal curves for four different temperatures.

Referring to FIG. 11, for example, shown are flow-versus-control-signal curves for four different temperatures. If a calibrated valve start of 30% were used and the valve/flow characteristic drifts with temperature as shown in FIG. 11, the MFC 800 may produce overshoot at 30 degrees Celsius or a long response delay at 60 degrees Celsius if the process gas temperature during run time is different than the calibration temperature. In addition, there may also be long-term drift of valve/flow characteristics due to aging of valve materials, which also results in performance degradation.

Figure 12:
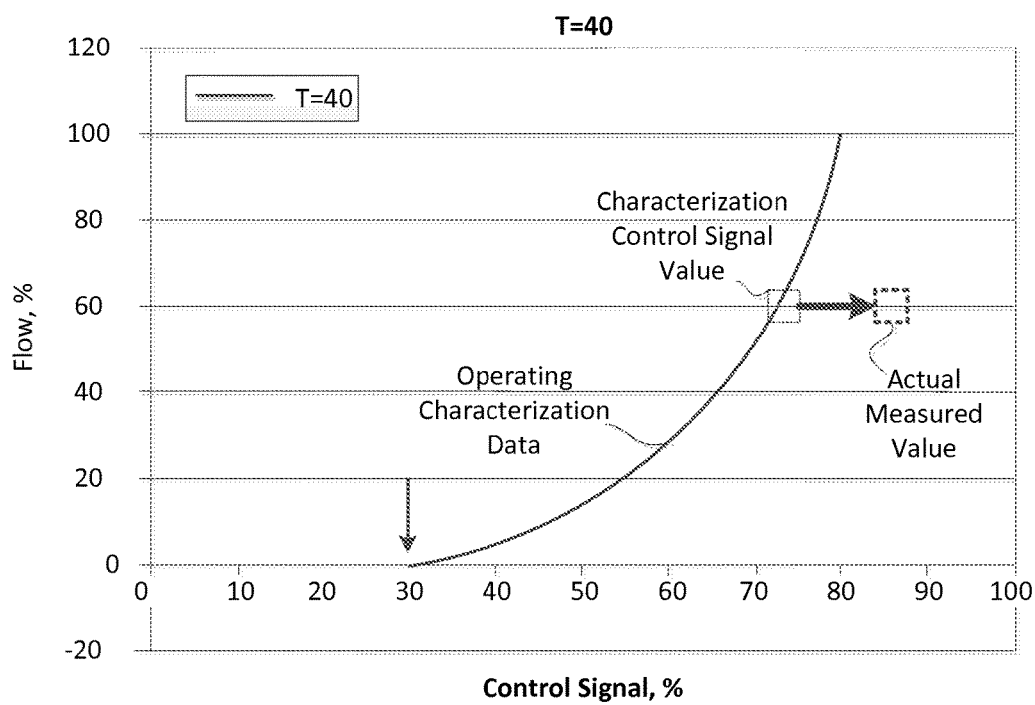
FIG. 12 is a graph depicting a control-signal-versus-flow curve.

Most of the time, a temperature and/or aging-related change of valve-flow characteristics is practically a "parallel shift," that may characterized by a curve that shifts left or right along a "control signal" axis while its shape stays substantially the same. Referring to FIG. 12 for example, shown is a calibrated control-signal-versus-flow curve obtained at 40 degrees Celsius that may be represented as data pairs in the operating characterization data 880. As shown, this exemplary collection of calibration data indicates that an optimal starting control signal 180 is 30% (of the maximum control signal level), and when the control signal 145 is at a value of 70% the flow rate is 60% (of the maximum flow level). When the MFC 800 is in use, however, the operating characteristics of the MFC 800 and/or the environment in which the MFC 800 is placed in may alter the characteristics of the MFC 800 so that to achieve the same particular 60% flow rate, the measured control signal value needs to be 85% (of the maximum control signal level). Assuming the 15% shift in the control signal value is part of an overall "parallel" shift of the entire control-signal-versus-flow curve, then a similar shift from 30% to 45% can be expected for the starting control signal.

As a consequence, as part of the adjustment to the adjustable non-zero starting control signal, during operation, before the set point signal 145 decreases, a measured value of the control signal is obtained at the particular flow rate (Block 908). The particular flow rate at which the measured flow rate is obtained is the same particular flow rate (discussed with reference to block 904) that was used in connection with obtaining the value of the calibrated control signal from the operating characterization data 880 in block 904 above. And the measured value is obtained before the set point 155 decreases so that the measured value is taken from an ascending control-signal-versus-flow curve (just as the calibrated control signal at the particular flow rate was obtained during calibration).

Figure 13:
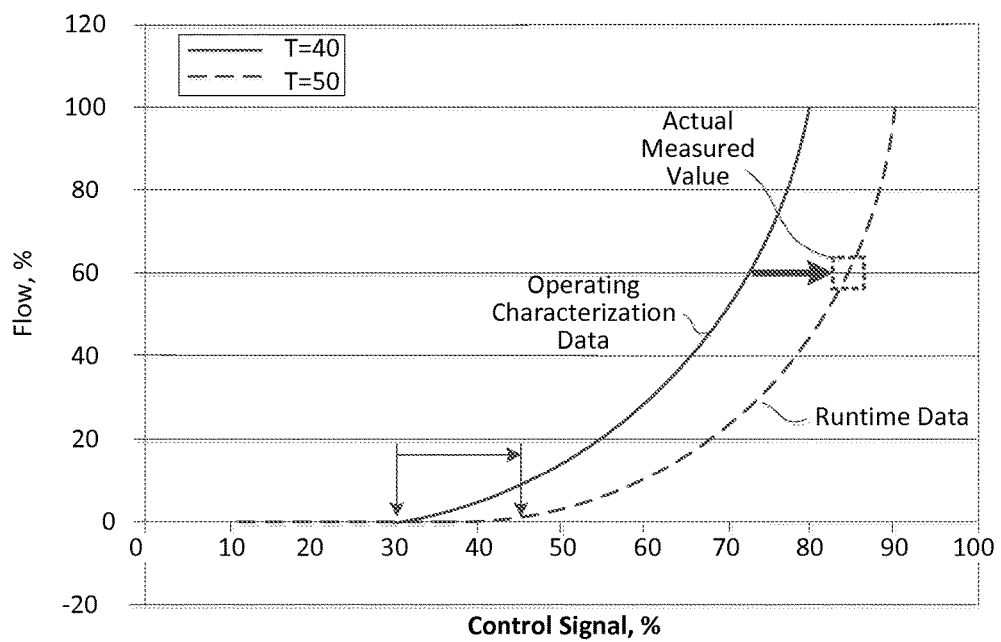
FIG. 13 is a graph depicting two control-signal-versus-flow curves for the mass flow controller depicted in FIG. 8 at different temperatures.

Referring to FIG. 13 simultaneously with FIG. 8 for example, shown are two control-signal-versus-flow curves for the same MFC 800 at different temperatures. More specifically, the same control-signal-versus-flow calibration curve depicted in FIG. 11 that was obtained at 40 degrees Celsius is shown, and in addition, another control-signal-versus-flow curve that depicts actual operating characteristics during run time for the MFC 100 at 50 degrees Celsius is depicted. If the set point 186 is 60% flow for example, the measured value of the control signal may be taken at 60% flow on the ascending curve, which is 85%.

As shown in FIG. 9, the measured value of the control signal (85% in the example depicted in FIG. 12) is compared with a level of a calibration control signal (70% in the example depicted in FIG. 12) at the particular flow rate (e.g., 60%) that is stored on the mass flow controller (Block 910). And based upon the comparison, the value of the adjustable non-zero starting control signal is adjusted to an adjusted value so that a next time the mass flow controller receives, when the valve is closed, another set point signal, the adjusted value is used (Block 912).

In many embodiments, the value of the adjustable non-zero starting control signal is adjusted based upon the following algorithm: ASCS=CSCS+MVCS−CVCS where ASCS is the adjustable non-zero starting control signal that is adjusted to maintain a desired response; CSCS is the calibrated starting control signal, which is the value of the starting control signal taken from the calibration data; MVCS is the measured value of the control signal that is measured at a particular flow level; and CVCS is the calibrated value of the control signal, which is the value of the calibrated control signal at the particular flow value.

With reference to FIG. 12 for example, the CSCS is 30% and the particular flow value is 60% so that MVCS is 85% and CVCS is 70%. As a consequence, ASCS for the next run is 45%. It should be recognized that the particular flow value that is selected may be any flow value that exists in both the characterization curve and the run time curve.

In embodiments where the operating characterization data 880 includes data for a plurality of pressures, the difference between the measured value of the control signal (MVCS) and the characterized value of the control signal (CVCS) is stored in the adjustment data 885 so that during a subsequent run, the stored difference is added to the value of the characterized non-zero starting control signal that is stored in the operating characterization data 880 (for the current pressure) to obtain the adjustable non-zero starting control signal (ASCS). And the method described above with reference to Blocks 908 to 912 is carried out again to adjust the difference data as needed for yet other subsequent process runs.

And in the embodiments where the operating characterization data 880 includes characterization data for only a single pressure, the adjustment data 185 includes the value of the adjustable non-zero starting control signal (ASCS), which is accessed during a subsequent process run (the same way the initial value of a characterized non-zero starting control signal is accessed as described with reference to Block 904), and applied to the control valve 150 as the adjustable non-zero starting control signal as discussed above with reference to Block 906. And the method described above with reference to Blocks 908 to 912 is carried out again to adjust the adjustable non-zero starting control signal as needed.

In variations of the method depicted in FIG. 9, the adjustment of the adjustable non-zero control signal can be done slowly, using estimations from many runs, with some predefined adjustment limit per run, for example 1% of valve voltage. It can also be filtered (integrated), to avoid effects of noisy valve measurements, especially at low set points. In addition, it is contemplated that large jumps of the adjustable non-zero starting control signal could indicate problems with the device; thus an alarm/warning may be triggered in response to an adjustable non-zero starting control signal jump exceeding a threshold.

Although the method described with reference to FIG. 9 adjusts the adjustable non-zero starting control signal responsive to changes in temperature, to further improve the ability of the adaptive valve start component 882 to adjust the value of the control signal 145 when the control valve 150 is starting from a closed position, temperature data may be gathered and used during runtime to improve aspects of the process depicted in FIG. 9.

For example, when a new adjustable non-zero starting control signal value (or difference data) is stored in the adjustment data 885, a temperature value from a temperature sensor in the MFC 800 may also be stored so that temperature information is stored in connection with the starting control signal value or difference data. The stored temperature data (in connection with the control signal or difference data) can be used to predict the optimal adjustable non-zero starting control signal value for subsequent process runs instantaneously if the temperature of the gas has changed significantly between the process runs.

Additional details of adaptive valve start systems and methodologies (outside of the context of the operating characterization data described herein) are found within U.S. patent application Ser. No. 13/206,022 entitled Mass Flow Controller Algorithm with Adaptive Valve Start Position, which is incorporated herein by reference.

It should be recognized that the adaptive characterization component 676, and the adaptive valve start component 882 are separately depicted in FIGS. 6 and 8 for ease of description, but these components may be implemented together in a single mass flow controller with one of the multi-mode control components 160, 460 described with reference to FIGS. 1 and 4.

Figure 14:
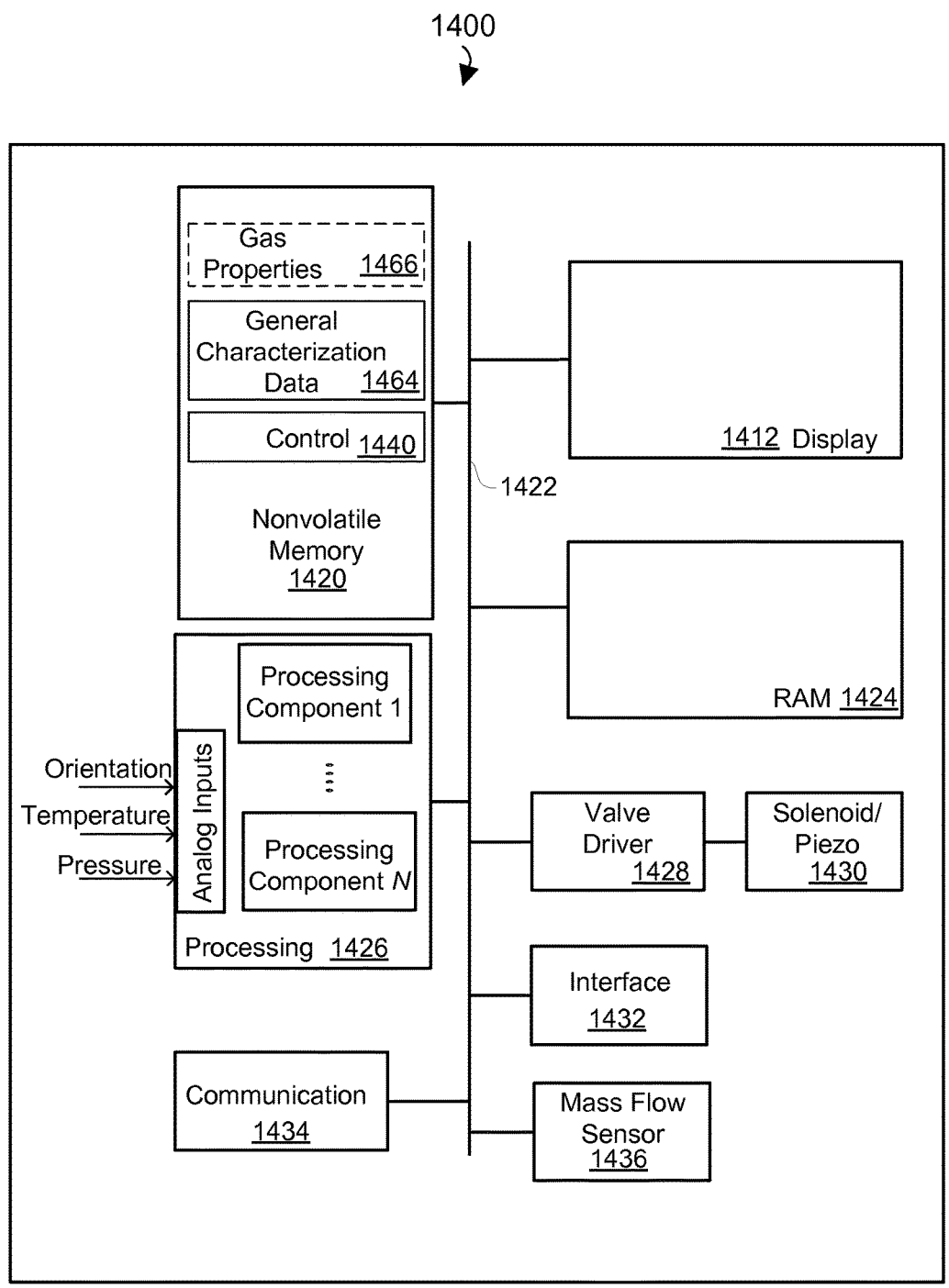
FIG. 14 is a block diagram depicting physical components that may be utilized to realize the mass flow controllers depicted in FIGS. 1, 4, 6, and 8.

Referring next to FIG. 14, shown is a block diagram 1400 depicting physical components that may be utilized to realize the MFCs 100, 400, 600, 800 described with reference to FIGS. 1, 4, 6, and 8. As shown, a display portion 1412, and nonvolatile memory 1420 are coupled to a bus 1422 that is also coupled to random access memory ("RAM") 1424, a processing portion (which includes N processing components) 1426, a valve driver component 1428 that is in communication with a solenoid or piezo type valve 1430, and an interface component 1432. Although the components depicted in FIG. 14 represent physical components, FIG. 14 is not intended to be a hardware diagram; thus many of the components depicted in FIG. 14 may be realized by common constructs or distributed among additional physical components. Moreover, it is certainly contemplated that other existing and yet-to-be developed physical components and architectures may be utilized to implement the functional components described with reference to FIG. 14.

This display portion 1412 generally operates to provide a presentation of content to a user, and in several implementations, the display is realized by an LCD or OLED display. In general, the nonvolatile memory 1420 functions to store (e.g., persistently store) data and non-transitory processor-executable code including code that is associated with the control components 140, 440, 640, 840. In addition, the nonvolatile memory 1420 may include bootloader code, software, operating system code, and file system code.

In many implementations, the nonvolatile memory 1420 is realized by flash memory (e.g., NAND or ONENAND™ memory), but it is certainly contemplated that other memory types may be utilized as well. Although it may be possible to execute the code from the nonvolatile memory 1420, the executable code in the nonvolatile memory 1420 is typically loaded into RAM 1424 and executed by one or more of the N processing components in the processing portion 1426. As shown, the processing component 1426 may receive analog temperature and pressure inputs that are utilized by the functions carried out by the control component 140, 440, 640, 840.

The N processing components in connection with RAM 1424 generally operate to execute the non-transitory processor-readable instructions stored in nonvolatile memory 1420 to effectuate the functional components depicted in FIGS. 1, 4, 6, and 8. For example, the control component 140, 440, 640, 840 may be realized by one or more of the N processing components in connection with non-transitory processor-readable code that is executed from RAM 1424 to carry out the methods described with reference to FIGS. 3, 5, and 9.

The interface component 1432 generally represents one or more components that enable a user to interact with the MFC 100, 400, 600, 800. The interface component 1432, for example, may include a keypad, touch screen, and one or more analog or digital controls, and the interface component 1432 may be used to translate an input from a user into the set point signal 155. And the communication component 1434 generally enables the MFC 100, 400, 600, 800 to communicate with external networks and devices including the external processing tools 170. One of ordinary skill in the art will appreciate that the communication component 1434 may include components (e.g., that are integrated or distributed) to enable a variety of wireless (e.g., WiFi) and wired (e.g., Ethernet) communications.

The mass flow sensor 1436 depicted in FIG. 14 represents a collection of components known to those of ordinary skill in the art to realize the mass flow sensor 125 shown in FIG. 1. For example, these components may include sensing elements, amplifiers, analog-to-digital conversion components, and filters.

Those of skill in the art will appreciate that the information and signals discussed herein may be represented using any of a variety of different technologies and techniques. For example, data, instructions, commands, and information, that may be referenced throughout the above description may be represented by voltages, currents, electromagnetic waves, magnetic fields or particles, optical fields or particles, or any combination thereof.

Those of skill will also appreciate that the various illustrative logical blocks, modules, circuits, and algorithm steps described in connection with the embodiments disclosed herein may be implemented by other alternative components than those depicted in FIG. 14. To clearly illustrate this interchangeability of hardware and software, various illustrative components, blocks, modules, circuits, and steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope of the present invention.

More specifically, the various illustrative logical blocks, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor (e.g., as shown in FIG. 14), or in a combination of the two. A software module may reside in non-transitory processor readable mediums such as the RAM memory 1424, non-volatile memory 1420, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mass flow controller comprising:
   a valve that is adjustable to control a flow rate of a gas responsive to a control signal;
   a pressure transducer that provides a pressure signal that indicates a pressure of the gas;
   a memory to store general characterization data that characterizes the mass flow controller in connection with a calibration gas in terms of flow values and corresponding control signal values;
   a mass flow sensor that provides a measured flow rate of the gas;
   a multi-gas control component that generates an open-loop process control signal for a desired process gas flow value and pressure by obtaining a control signal value from the general characterization data based upon the pressure, the desired process gas flow value, a molecular mass for a process gas type, and a molecular mass for the calibration gas; and
   a multi-mode control component that disengages a feedback control loop that uses the measured flow rate of the gas when a threshold condition is satisfied and controls the valve using the open-loop process control signal.

2. The mass flow controller of claim 1, including a characterization data modification component configured to change the general characterization data responsive to any differences between set point signals and corresponding measured flow signals obtained each time the feedback control loop is re-engaged.

3. The mass flow controller of claim 1, including an adaptive characterization component configured to apply a scaling factor to the characterization data responsive to any differences between set point signals and corresponding measured flow signals obtained each time the feedback control loop is re-engaged.

4. The mass flow controller of claim 1, wherein the multi-mode control component reengages the feedback control loop when a timer has expired.

5. The mass flow controller of claim 1, wherein the multi-mode control component reengages the feedback control loop when the rate of pressure change of the gas falls below the threshold condition.

6. A mass flow controller comprising:
a valve that is adjustable to control a flow rate of a gas;
a pressure transducer that provides a pressure signal that indicates a pressure of the gas;
a memory including general characterization data that characterizes the mass flow controller in connection with a calibration gas;
a mass flow sensor that provides a measured flow rate of the gas;
a multi-gas control component that generates a process control signal value for a desired flow value and pressure by accessing the general characterization data using a modified-flow-value that is equal to $F_{pr}*(M_{pr}/M_{cal})^k$, where k has a value between 0.2 and 0.5 depending upon a flow range of the mass flow controller, $F_{pr}$ is a desired process gas flow value, $M_{pr}$ is the molecular mass for the selected process gas type, and $M_{cal}$ is a molecular mass for the calibration gas; and a multi-mode control component that utilizes the process control signal to control the valve in response to a change in the pressure of the gas exceeding a threshold.

7. The mass flow controller of claim 6, including a characterization data modification component configured to change the general characterization data responsive to any differences between set point signals and corresponding measured flow signals obtained each time the measured flow rate of the gas is used again.

8. The mass flow controller of claim 6, including an adaptive characterization component configured to apply a scaling factor to the characterization data responsive to any differences between set point signals and corresponding measured flow signals obtained each time the measured flow rate of the gas is used again.

9. The mass flow controller of claim 6, wherein the multi-mode control component uses the measured flow rate of the gas again to control the valve when a timer has expired.

10. The mass flow controller of claim 6, wherein the multi-mode control component uses the measured flow rate of the gas again to control the valve when the rate of pressure change of the gas falls below the threshold condition.

11. A mass flow controller comprising:
a valve that is adjustable to control a flow rate of a process gas;
a pressure transducer configured to provide a pressure signal that indicates a measured pressure of the process gas;
a memory to store general characterization data that characterizes the mass flow controller in connection with a calibration gas;
a mass flow sensor configured to provide a measured mass flow rate of the process gas;
a control component configured to control the valve to provide a desired process gas flow value using a process control signal value instead of the measured mass flow rate when a change in a pressure of the process gas exceeds a threshold, the control component is configured to obtain the process control signal value at the measured pressure by accessing the general characterization data using a modified-flow-value that is equal to $F_{pr}*(M_{pr}/M_{cal})^k$ where k has a value between 0.2 and 0.5 depending upon a flow range of the mass flow controller, $F_{pr}$ is the desired process gas flow value, $M_{pr}$ is the molecular mass for the selected process gas type, and $M_{cal}$ is a molecular mass for the calibration gas.

12. The mass flow controller of claim 11, including a characterization data modification component configured to change the general characterization data responsive to any differences between set point signals and corresponding measured flow signals obtained each time the measured mass flow rate of the gas is used again.

13. The mass flow controller of claim 11, including an adaptive characterization component configured to apply a scaling factor to the characterization data responsive to any differences between set point signals and corresponding measured flow signals obtained each time the measured flow rate of the gas is used again.

14. The mass flow controller of claim 11, wherein the control component uses the measured mass flow rate of the gas again to control the valve when a timer has expired.

15. The mass flow controller of claim 11, wherein the control component uses the measured flow rate of the gas again to control the valve when the rate of pressure change of the gas falls below the threshold condition.

* * * * *